3,574,532
WASH TREATMENT TO RESTORE THE DE-
GRADED D2EHPA-TBP USED IN FISSION
PRODUCT EXTRACTION
Wallace W. Schulz, Richland, and Samuel J. Beard,
Kennewick, Wash., assignors to the United States of
America as represented by the United States Atomic
Energy Commission
No Drawing. Filed Mar. 20, 1969, Ser. No. 809,032
Int. Cl. C22b 59/00
U.S. Cl. 23—22       1 Claim

ABSTRACT OF THE DISCLOSURE

A process is disclosed for restoring the cerium (IV) extraction capacity of a chemically and/or radiolytically degraded solvent consisting of di(2-ethylhexyl) phosphoric acid and tributyl phosphorate in a hydrocarbon diluent. The degraded solvent is treated with an aqueous solution of potassium permanganate and a mineral acid, preferably nitric acid.

CONTRACTURAL ORIGIN OF THE INVENTION

The invention herein described was made in the course of or under a contract with the United States Atomic Energy Commission.

BACKGROUND

Certain processes utilized in the treatment of solutions resulting from the chemical processing of irradiated nuclear fuels involve liquid-liquid extraction utilizing as the solvent a solution of di(2-ethylhexyl) phosphoric acid (D2EHPA) and tributyl phosphate (TBP) in a hydrocarbon solvent.

U.S. Pat. No. 3,351,424, granted Nov. 7, 1967 to Lane A. Bray and Francis P. Roberts, discloses a process in which this solvent is utilized for the extraction of cerium from the trivalent rare earths.

In the Bray and Roberts process, an aqueous nitric acid solution containing cerium-144, promethium-147, other trivalent lanthanide rare earths and small amounts of $Sr^{90}$, $Ru-Rh^{106}$, $Y^{91}$, and $Zr-Nb^{95}$ is adjusted to a pH of 1–4 and is subjected to solvent extraction with the D2EHPA-TBP-hydrocarbon solvent referred to above. Preferably, particularly if the solution contains iron, lead and chromium (as will be the case when the process is applied to crude fission products) the complexant N-hydroxyethyl-ethylenediamine triacetic acid is added to the aqueous feed.

Under these conditions, the cerium, promethium and other rare earths are taken up by the solvent. Most of the iron, lead, chromium, zirconium, niobium, ruthenium and rhodium are retained in the aqueous solution. The strontium is taken up by the solvent, from which it can be selectively removed by washing with nitric acid or citric acid. The hydrocarbon diluent which has been found most satisfactory is termed "normal paraffinic hydrocarbon" (NPH), and is a mixture of straight chain hydrocarbons having from 10 to 14 carbon atoms. Another solvent that has been extensively used is Soltrol 170, a mixture of straight and branched chain paraffinic hydrocarbons boiling in the kerosene range.

The solvent, containing the cerium, promethium and other rare earths is then scrubbed with a 2 M solution of $HNO_3$ containing 0.2 M $Na_2S_2O_8$, $(NH_4)_2S_2O_8$ or $K_2S_2O_8$ and 0.02 M $AgNO_3$. The silver-catalyzed persulfate oxidizes the cerium to Ce(IV) which is retained in the solvent, while the promethium and other trivalent rare earths remain in the valence (III) state and are premoved in the aqueous solution.

When the same solvent is used a number of times, there is such a decline in the separation obtained that the solvent must be discarded. This appears to be due to the degradation of the hydrocarbon solvent by radiolytic and chemical reactions, producing reducing agents which reduce some of the cerium to valence (III). This causes it to go in the aqueous, rather than the organic phase, particularly in the scrubbing step referred to above. Moreover, any yttrium present tends to stay in the solvent throughout the cycle, continually increasing until it reaches such a concentration as to interfere with the extraction.

The above problems are accentuated by the fact that the Bray and Roberts process is commonly carried out in conjunction with the process of treating nuclear waste solutions described in U.S. Pat. 3,154,500 granted Oct. 27, 1964 to George Jansen, Jr., et al. and also described in an article by Schulz, et al., Industrial and Engineering Chemistry, Process Design and Development, vol. 2, pp. 134–139 (1963). The two processes are frequently carried out in the same plant, utilizing the same body of solvent.

The process described in the Jansen et al. patent and the Schulz et al. article has been used in the Strontium Semiworks, a portion of Hanford Works of the U.S. Atomic Energy Commission located at Richland, Wash. and has come to be known as the "SSW Process." It was designed to recover a purified strontium-90 product. A feedstock is prepared by adding diethylenetriamine pentacetic acid to a crude $Sr^{90}$ concentrate derived from the chemical processing of irradiated uranium nuclear fuel by the Purex process. The feed is buffered at a pH of about 4.7 by the addition of sodium hydroxide and sodium acetate. A solvent is employed which is a solution of about 0.4 M D2EHPA and 0.2 TBP in a hydrocarbon diluent.

The feed is contacted countercurrently with the solvent in a column which is termed the "A" column, the solvent being scrubbed by an aqueous solution of sodium citrate and citric acid having a pH of 2.5–3.0.

The bulk of the strontium and calcium are taken up by the solvent while the bulk of the cerium-144, promethium-147 and other lanthanide rare earths, and almost all the iron, lead, yttrium, zirconium-niobium-95, and rhodium-ruthenium-106 are discharged in the aqueous waste.

The strontium is then separated from the calcium by stripping the solvent in the second column, termed the "B" column, with a 1.0 M aqueous solution of citric acid. The strontium is largely stripped into the aqueous solution while the calcium remains the organic solvent. The calcium and other ions have been removed from the solvent by washing with an aqueous solution which is 0.5 M citric and 0.5 M oxalic acid.

When solvent is reused a number of times in the SSW process, there is a gradual accumulation in the solvent of impurities, e.g. iron, chromium, zirconium, niobium, ruthenium and yttrium which interfere with the extraction. It has been found that the solvent can be made suitable for reuse in the SSW process by treatment with sodium hydroxide and disodium tartrate or trisodium citrate followed by an acid wash.

Use in the SSW process causes chemical-radiolytic degradation of the solvent similar to that in the Bray et al. process with the same loss of ability to extract cerium when the solvent is used in the latter process. Moreover, while the removal of yttrium in the SSW solvent treatment is advantageous in the Bray and Roberts process, this treatment actually increases the degradation of the ability of the solvent to extract cerium.

SUMMARY OF INVENTION

We have found that the D2EHPA-TBP-hydrocarbon solvent which has become unsuitable for use in the process of Bray and Roberts, U.S. Pat. No. 3,351,424, due to chemical and/or radiolytic degradation, can be restored essentially to the effectiveness of unused or virgin solvent by treatment with an aqueous solution of potassium permanganate and a mineral acid, preferably nitric acid.

DETAILED DESCRIPTION

The preferred solvent for use in the SSW process for recovery of strontium-90 from radioactive wastes, described in U.S. Pat. 3,154,500, and the Bray and Roberts process for the separation of cerium-144 from trivalent rare earths in radioactive wastes, described in U.S. Pat. 3,351,424, is 0.4 M di(2-ethylhexyl) phosphoric acid (D2EHPA), 0.2 M tributyl phosphate (TBP), in "normal paraffinic hydrocarbon" (NPH), a mixture of straight-chain paraffinic hydrocarbons having 10 to 14 carbon atoms. When the solvent has been used in the SSW process, it is treated with an aqueous solution which is 2.0 to 2.5 M NaOH and 0.1 M to 0.25 M disodium tartrate ($Na_2Tar$) or trisodium citrate ($Na_3Cit$) in sufficient quantity (which depends on the efficiency of contact) to convert all the D2EHPA to its sodium salt. A temperature of about 50° C. is preferred, though 25° C. is satisfactory. The solvent is then washed with nitric acid containing a small amount of oxalic acid, the presence of the latter improving the removal of $Zr^{95}$–$Nb^{95}$.

The following examples illustrate the processes:

Example 1

This illustrates the SSW solvent treatment process. Used solvent from the Strontium Semiworks of the Hanford Works was analyzed. It was found to have the following composition:

Diluent: Soltrol 170
D2EHPA: 0.35 M
TBP: 0.22 M
U: 0.0022 M
$Y^{91}$: $16.4 \times 10^{-4}$ μci/ml.
$Ce^{144}$: $7.45 \times 10^{-4}$ μci/ml.
$Zr^{95}$–$Nb^{95}$: $8.02 \times 10^{-4}$ μci/ml.
$Ru^{106}$–$Rh^{106}$: $0.45 \times 10^{-4}$ μci/ml.

The concentrations of the first three solutes were determined by chemical analysis. The concentrations of the fission products (last four items) were determined by gamma energy pulse height analysis.

Next, 25 ml. portions of the used solvent were agitated 15 minutes at 50° C. (unless otherwise noted below) with one-fifth volume (5 ml.) of an aqueous alkaline wash solution. The phases were allowed to separate by standing at 50° C. (unless otherwise noted below), and separation was completed by centrifuging. The results are shown in Table I.

TABLE I

| | | Decontamination factor | | | | |
|---|---|---|---|---|---|---|
| | Wash composition | Y-91 | Ce-144 | Zr-Nb-95 | Ru-Rh-106 | Gross γ |
| Experiment No.: | | | | | | |
| 1 | 2.5 M NaOH | 37 | 43 | 32 | 3 | 31 |
| 2¹ | 2.5 M NaOH | 15 | 24 | 26 | 4 | 22 |
| 3² | 2.5 M NaOH-0.1 M $Na_2Tar$ | 15 | 57 | 33 | 4 | 27 |
| 4 | 2.5 M NaOH-0.075 M $KMnO_4$ | 29 | 27 | 28 | 3 | 45 |
| 5² | 2.5 M NaOH-0.1 M $Na_3Cit$ | 236 | 219 | 87 | 4 | 75 |
| 6 | 2.0 M $Na_2CO_3$ | 12 | 12 | 12 | 4 | 11 |

¹ At 25° C.
² $Na_2Tar$ is disodium tartrate, $Na_3Cit$ is trisodium citrate.

The decontamination factor for a given constituent is the ratio of its concentration in the solution before the wash treatment to its concentration after the wash treatment. The "decontamination factor" for "gross γ" is the ratio of the intensity of the total gamma radiation from a given volume of solution before the wash treatment to that after the wash treatment.

Washing with nitric acid restored the D2EHPA to its acid form but removed very little additional fission product activity.

Example II

This illustrates our claimed process.

Various batches of D2EHPA-TBP-hydrocarbon solvent were tested for their effectiveness in the Bray and Roberts process. The test solvent was agitated for 60 minutes at 25° C. with an equal volume of an aqueous solution of the following composition:

$HNO_3$: 1.96 M
$Ce(NO_3)_3$: 0.0071 M
$La(NO_3)_3$: 0.0144 M
$(NH_4)_2S_2O_8$: 0.2 M
$AgNO_3$: 0.02 M

The distribution ratio $$E_a^o$$

of the cerium between the organic and the aqueous phases was determined. The results are shown in Table II. The effectiveness of the $HNO_3$-$KMnO_4$ wash is apparent.

TABLE II

| Organic source or description | Wash composition | Time, hours | Temp., ° C. | Ce(IV) $E_a^o$ ¹ of washed solvent |
|---|---|---|---|---|
| Virgin Solvent | None | | | 500–1,200 |
| SSW Tank 11 ² | None | | | 27.8 |
| Do ² | 2 M $HNO_3$-0.2 M $(NH_4)_2S_2O_8$-0.02 M $AgNO_3$ | 24 | 25 | 60.7 |
| Do ² | 2 M $HNO_3$-0.2 M $(NH_4)_2S_2O_8$-0.02 M $AgNO_3$ | 24 | 40 | 54.9 |
| Do ² | 2 M $HNO_3$-0.25 M $KMnO_4$ | 1 | 25 | 561 |
| Do ² | 2 M $HNO_3$-0.25 M $KMnO_4$ | 24 | 25 | 294 |
| Do ² | 6 M $HNO_3$-0.25 M $KMnO_4$ | 1 | 25 | 336 |
| Irradiated NPH ³ | None | | | 69.5 |
| Do ³ | 2 M $HNO_3$-0.25 M $KMnO_4$ | 1 | 25 | 1,200 |
| Irradiated Soltrol-170 ³ | None | | | 72.4 |
| Do ³ | 2 M $HNO_3$-0.25 M $KMnO_4$ | 1 | 25 | 1,160 |
| Chemically degraded Soltrol-170 ⁴ | None | | | 0.33 |
| Do ⁴ | 2 M $HNO_3$-0.25 M $KMnO_4$ | 1 | 25 | 900 |
| Do ⁴ | 6 M $HNO_3$-0.25 M $KMnO_4$ | 1 | 25 | 1,060 |

¹ $E_a^o$ is concentration of Ce in organic phase/concentration of Ce in aqueous phase.
² The "SSW Tank 11" solvent had been used in the SSW Process and thereafter washed with an aqueous sodium hydroxide-sodium tartrate solution and then with 2 M $HNO_3$-0.1 M $H_2C_2O_2$.
³ Irradiated to total exposure of 247 watt hours/liter in a cobalt-60 facility.
⁴ The Soltrol-170 was chemically degraded by agitation for 21 hours at 80° C., with an equal volume of 8 M $HNO_3$-0.05 M $NaNO_2$.

Example III

This further illustrates our claimed process.

A 0.4 M D2EHPA–0.2 M TBP solvent was prepared with Soltrol-170 which had been chemicaly degraded as described in Table II, note (d). The solvent was washed sucessively with equal volume portions of 3.8 M NaOH, 6 M $HNO_3$, and water. Portions of the resulting organic phase were contacted one hour at 25° C. with equal volumes of an aqueous solution, 2 M $HNO_3$ and 0.05 to 0.25 M $KMnO_4$.

Manganese dioxide, which accumulates at the aqueous-organic interface and complicates phase separation, can be destroyed by treatment with $H_2O_2$ or oxalic acid after the $HNO_3$-$KMnO_4$ contact but prior to separation of the aqueous and organic phases.

The extraction capacity for cerium was determined by agitating (for 60 minutes at 25° C.) the test solvent with an equal volume of an aqueous solution 1.96 M $HNO_3$, 0.0071 M $Ce(NO_3)_3$-0.0144 M $La(NO_3)_3$ and also 0.02 M in $AgNO_3$ and 0.2 M in either $K_2S_2O_8$ or $(NH_4)_2S_2O_8$, and then separating the phases, in accordance with the teachings of U.S. Patent 3,351,424.

Results are shown in Table III.

TABLE III

| Wash, $KMnO_4$ M: | Ce(IV) $E_a^o$ of washed solvent |
|---|---|
| Unwashed | 0.17 |
| 0.05 | 21.4 |
| 0.10 | 361 |
| 0.20 | 1320 |
| 0.25 | 880 |
| 0.25 [a] | 515 |
| 0.25 [b] | 721 |

[a] $MnO_2$ destroyed by addition of 30% $H_2O_2$ to organic-aqueous mixture after $KMnO_4$-$HNO_3$ wash.
[b] $MnO_2$ destroyed by addition of 0.5 M oxalic acid to organic-aqueous mixture after $KMnO_4$-$HNO_3$ wash.

As is apparent from Examples II and III, solutions 2 to 6 M in nitric acid and 0.10 to 0.25 M in $KMnO_4$ give satisfactory results.

Other mineral acids, e.g. sulfuric and phosphoric acid may be substituted for the nitric acid. We have, however, found alkaline permanganate to be ineffective.

The embodiments of the invention in which an exclusive property or privilege is claimed are defined as follows:

1. In a process in which tetravalent cerium is extracted from an aqueous solution in the presence of silver-catalyzed persulfate by a solvent consisting of di(2-ethylhexyl) phosphoric acid in a hydrocarbon diluent and in which the solvent has been subjected to chemical and/or radiolytic degradation, the improvement comprising:

treating the degraded solvent with an aqueous solution which is 0.10 M to 0.25 M in potassium permanganate and 2 to 6 M in nitric acid for a time sufficient to restore essentially the effectiveness of virgin solvent.

References Cited

UNITED STATES PATENTS 3,351,424  11/1967  Bray et al. _____ 23—22

OTHER REFERENCES

Butler et al., "Industrial & Engineering Chemistry," Vol. 53, August 1961, pp. 651–654.

HERBERT T. CARTER, Primary Examiner

U.S. Cl. X.R.

23—23, 312